May 16, 1939.  P. B. PARKS ET AL  2,158,146
THERMOSTAT
Filed Sept. 20, 1937
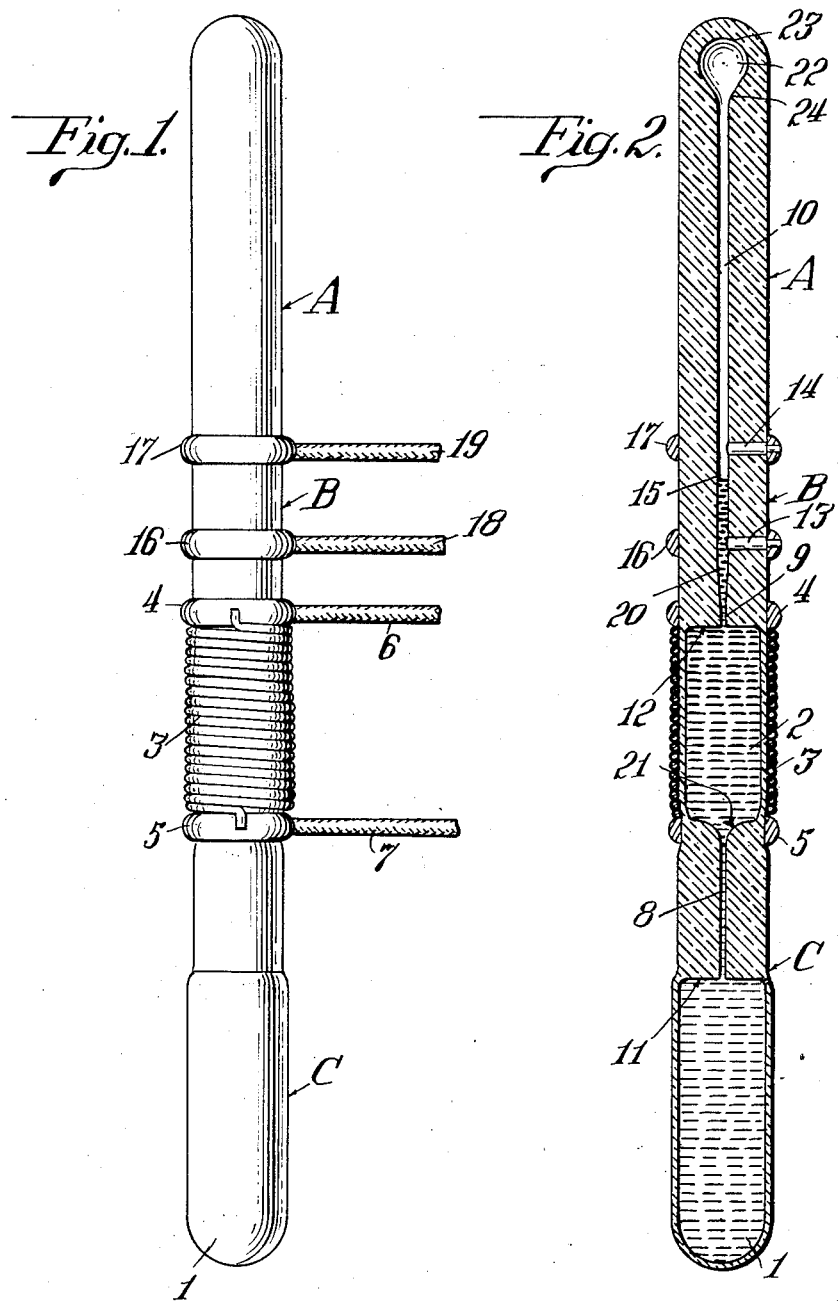
Inventor
Paul B. Parks
and Timothy J. Lehane
By Barnett Truman
Attorneys Patented May 16, 1939

2,158,146

UNITED STATES PATENT OFFICE 2,158,146

THERMOSTAT

Paul B. Parks, Oak Park, and Timothy J. Lehane, Chicago, Ill., assignors to Vapor Car Heating Company, Inc., Chicago, Ill., a corporation of New York Application September 20, 1937, Serial No. 164,781

5 Claims. (Cl. 200—122)

This invention relates to certain new and useful improvements in thermostats of the mercury column type, or what are sometimes known as contact thermometers, the invention relating more particularly to improvements in the thermometer tube whereby breakage of the tube as well as the mercury column is minimized.

The well-known mercury column thermostat resembles an ordinary mercury thermometer with electric contacts so positioned in the top of the mercury column that a circuit through a portion of this mercury column will be completed or broken as the temperature reaches or falls below a certain predetermined temperature at which the device is designed to function. In order to change or adjust the temperature at which the thermomstat will function, auxiliary heat is sometimes added to the mercury, usually to the bulb portion of the thermometer. The present invention is shown as applied to a thermostat of this general type, the thermostat here shown by way of example being substantially of the type disclosed and claimed in the patent of Parks and Miller, No. 2,046,578, dated July 7, 1936. In an instrument of this type, the mercury reservoir of the thermometer is divided between two connected bulbs, one of these bulbs (preferably the lower bulb) being exposed to the atmosphere and functioning in the usual manner in response to changes in atmospheric temperature. A heating element, preferably an electric heating coil, is positioned closely about the upper bulb and this heating element is usually enclosed in an insulating covering so as to insulate this portion of the apparatus against atmospheric disturbances of all kinds. By suitably regulating the strength of the current through the heating coil, and thereby adjusting the amount of auxiliary heat applied to the mercury, the temperature at which the instrument will function may be adjusted.

The improvements of the present invention may be used with a thermostat of the improved double bulb variety just briefly described, or with the older type of single bulb thermostat wherein no provision is made for adjusting the operating temperature.

With any of these thermostats it has been found that if the thermometer is jarred or violently disturbed when in an inverted position there is a tendency for the mercury to run down the bore in the stem and crack or break the glass at the upper end thereof, particularly in thermostatic instruments having a bore of sufficient diameter to house a mercury column of sufficient cross-sectional area to carry the required electric current. Furthermore, even when the bulb is positioned in normal upright position, when used on a railway car or in other installations where the thermometer is subject to rather violent jars or shocks there is a tendency to push up the mercury and break the mercury column even though the glass tube may not be damaged. This breakage or disturbance of the continuity of the mercury column will, of course, impair the accuracy and effective operation of the instrument.

According to the present invention means are provided for restricting the upward flow of the mercury so that it will not be thrown upward by shocks or disturbances of the type to which the instrument may be subjected. The improvements consist in restricting the lower ends of the passages which feed the mercury column so as to impede the upward flow, and also so forming the upper ends of the bulbs that the larger mass of mercury in a bulb cannot be thrown upwardly through the passage leading therefrom.

The principal object of this invention is to provide an improved thermostat such as briefly described hereinabove and disclosed more in detail in the specification which follows.

Another object is to provide an improved form of thermostat tube designed to retard the upward passage of mercury in response to shocks or jars to which the tube is subjected.

Another object is to provide an improved contact thermometer tube in which the lower portion of the bore leading from the bulb is of extremely restricted cross-sectional area, the bore being expanded above this retricted portion to provide a mercury column of sufficient cross-sectional area to carry the requisite electric current.

Another object is to provide an improved contact thermometer tube in which the upper end of the bulb or reservoir is substantially horizontal with the bore leading abruptly from this horizontal wall so that upward shocks imparted to the large mass of mercury in the bulb will not be concentrated on the mercury column leading from the bulb.

Another object is to provide an improved contact thermometer in which the upper end of the bore is expanded in an improved manner to provide a safety release chamber, strengthen the bulb, and facilitate the flow of mercury from this chamber.

Other objects and advantages of this invention will be more apparent from the following detailed description of one approved form of thermostat constructed and operating according to the principles of this invention.

In the accompanying drawing:

Fig. 1 is a side elevation of the improved thermostatic tube.

Fig. 2 is a central vertical section through this tube.

The thermometer portion of this instrument comprises a glass tube A closed at both ends and housing a series of chambers and passages which are evacuated except for a quantity of mercury which expands and contracts in well known manner in accordance with changes in temperature to which it is subjected. As is usual in instruments of this character, the upper portion of the body of mercury is in the form of a mercury column of rather small cross-sectional area so that there will be a substantial increase or decrease in the height of this mercury column as the temperature rises or falls.

In the example here shown, the tube comprises an upper stem portion B and a lower reservoir portion C, and the reservoir portion houses two separate bulbs or reservoirs. The lower bulb 1 is exposed to the air and responds to atmospheric temperature changes in the usual manner. The upper bulb 2 is surrounded by an electric heating element 3 and is used for adjusting the temperature at which the instrument will function. As here shown the heating element 3 is in the form of a coil of high resistance wire connected at its respective ends to the rings 4 and 5 from which lead the wires 6 and 7 of the energizing circuit. By properly adjusting the strength of this current (usually by means of a rheostat or variable resistance in the circuit) the amount of heat applied to the bulb 2 may be determined. This auxiliary heat is added to the heat of the air applied to the exposed bulb 1 to determine the height of the mercury column as hereinafter described. It will be understood that the upper bulb 2 and heating element 3 will usually be enclosed in a suitable insulating covering so as to confine the heat imparted by element 3 and also protect this upper bulb from all atmospheric temperature disturbances. As this forms no part of the present invention, this insulation has not here been shown.

A small capillary passage 8 connects the lower bulb 1 with the upper bulb 2, and a similar small restricted passage 9 leads upwardly from bulb 2, this passage 9 forming the lower end of the bore 10 which houses the mercury column within stem B. These passages 8 and 9 are of sufficient size to permit the mercury to flow upward in response to temperature changes, but otherwise are made as small as practicable to restrict the upward flow of mercury in response to jars or shocks to which the instrument is subjected. Furthermore, the upper ends 11 and 12 of the bulbs 1 and 2 respectively are made substantially horizontal, the passages 8 and 9 leading abruptly from these horizontal walls and at right angles thereto. As a result, when an upward throw or shock is imparted to the relatively large masses of mercury in the bulbs, the blow or hammer action will be taken by the upper walls 11 and 12 and will not tend to force the larger mass of this mercury into the restricted passages, as would be the case if the inlets to these passages were graduated or rounded as is the usual practice.

The similar electric contacts 13 and 14 are in the form of platinum wires sealed into the glass tube so that their inner ends engage the mercury column 15 in bore 10 of stem B. The outer ends of the contact wires are sealed into the conducting rings 16 and 17 from which lead the circuit wires 18 and 19 respectively. It will be understood that the lower contact 13 is always in engagement with the mercury column, but the instrument will be so designed that the upper end of this mercury column 15 will only engage the upper contact 14 when a predetermined maximum temperature is reached thereby completing a control circuit through wires 18 and 19. When the temperature to which the instrument is subjected falls below this predetermined temperature the mercury column will fall below the contact 14 and break this circuit.

It will be understood that the very restricted or capillary mercury column in passages 8 and 9 is of too small diameter or cross-sectional area to carry a suitable electric current, that is the resistance of this column would be too high. Accordingly, the bore 10 of the instrument must be of somewhat increased diameter so that the mercury column 15 will have sufficient cross-sectional area to carry this current. In other words, the cross-sectional area of the bore 10 will be substantially the same as that heretofore used in these instruments, whereas the diameter or cross-sectional area of the restricted portion 9 is made considerably smaller. The restricted passage 9 expands outwardly into the larger bore 10 at 20 below the position of the lower electric contact member 13. Since it is desirable to facilitate the downward flow of the mercury column as the temperature decreases and thus prevent breakage of the mercury column, the portion 20 of the bore is tapered as shown. It may also be desirable to round the lower end of the upper bulb 2 at 21 to facilitate the passage of mercury downwardly into passage 8 leading to the lower bulb 1.

It is usual to provide an expanding chamber in the upper portion of bore 10 so that, if the instrument should be subjected to extremely high and unusual temperatures, the mercury column will not be forced into engagement with the upper end of the tube thus breaking the instrument but will be permitted to expand in this chamber. In the present improved construction this chamber 22 is formed at the extreme upper end of bore 3 and is of rounded or spherical form at its upper end as indicated at 23, the lower portion of the chamber rounding or sloping at 24 into the bore 10. This form not only provides maximum strength at the upper end of the tube, but also facilitates the flow of mercury back into the bore 10.

It will now be apparent that either when the instrument is inverted during shipment or other handling processes, or when subjected to violent shocks or jars when in normal upright installed position, the improved constructions hereinabove described will tend to prevent the mercury from being thrown upwardly into the bore 10 thus perhaps breaking the upper end of the stem, or at least breaking the mercury column so as to disturb its acuracy and efficiency when in operation. At the same time, that portion of the mercury column which carries the controlling circuit is of sufficient cross-sectional area to carry the current without undue resistance.

It will be apparent that the same principles could be applied to the older single bulb type of thermometer or thermostat, in which case we can either consider the lower bulb 1 as being omitted, or the upper bulb 2 as being omitted and the passage 8 leading directly into the restricted lower end 9 of the upper bore 10.

We claim:

1. A contact thermometer comprising a tube closed at both ends and formed with a lower reservoir portion and an upper stem portion, the reservoir comprising a bulb containing mercury from which bulb a small bore extends upwardly through the stem to house the mercury column, the bore directly above the bulb being so restricted that the mercury column therein will be of too small diameter to carry the electric control current but expanding at a higher level to a somewhat increased diameter so that the mercury column will be of sufficient cross-sectional area to carry the control current, and a pair of spaced apart electric contacts mounted in the stem to engage the mercury column in the bore of increased diameter.

2. A contact thermometer comprising a tube closed at both ends and formed with a lower reservoir portion and an upper stem portion, the reservoir comprising a bulb containing mercury from which bulb a small bore extends upwardly through the stem to house the mercury column, the upper end of the bulb being substantially horizontal, and the bore extending abruptly upwardly from this horizontal wall, the bore directly above the bulb being so restricted that the mercury column therein will be of too small diameter to carry the electric control current but expanding at a higher level to a somewhat increased diameter so that the mercury column will be of sufficient cross-sectional area to carry the control current, and a pair of spaced apart electric contacts mounted in the stem to engage the mercury column in the bore of increased diameter.

3. A contact thermometer comprising a tube closed at both ends and formed with a lower reservoir portion and an upper stem portion, the reservoir comprising a pair of bulbs containing mercury and connected by a restricted passage, the upper end of the lower bulb being substantially horizontal and the passage leading abruptly from this horizontal wall to impede the upward flow of mercury from the lower bulb, an electric heating coil positioned about one of the bulbs, the other bulb being exposed to the air and responsive to the temperature thereof, the stem being formed with a small bore extending upwardly from the upper bulb to house the mercury column, the bore directly above the bulb being so restricted that the mercury column therein will be of too small diameter to carry the electric control current but expanding at a higher level to a somewhat increased diameter so that the mercury column will be of sufficient cross-sectional area to carry the control current, and a pair of spaced apart electric contacts mounted in the stem to engage the mercury column in the bore of increased diameter.

4. A contact thermometer comprising a tube closed at both ends and formed with a lower reservoir portion and an upper stem portion, the reservoir comprising a pair of bulbs containing mercury and connected by a restricted passage, the upper end of the lower bulb being substantially horizontal and the passage leading abruptly from this horizontal wall to impede the upward flow of mercury from the lower bulb, an electric heating coil positioned about one of the bulbs, the other bulb being exposed to the air and responsive to the temperature thereof, the upper end of the upper bulb also being substantially horizontal, the stem being formed with a small bore extending abruptly upwardly from the horizontal wall of the bulb to house the mercury column, this bore directly above the bulb being so restricted that the mercury column therein will be of too small diameter to carry the electric control current but expanding at a higher level to a somewhat increased diameter so that the mercury column will be of sufficient cross-sectional area to carry the control current, and a pair of spaced apart electric contacts mounted in the stem to engage the mercury column in the bore of increased diameter.

5. A contact thermometer comprising a tube closed at both ends and formed with a lower reservoir portion and an upper stem portion, the reservoir comprising a pair of bulbs containing mercury and connected by a restricted passage, an electric heating coil positioned about one of the bulbs, the other bulb being exposed to the air and responsive to the temperature thereof, the stem being formed with a small bore extending upwardly from the upper bulb to house the mercury column, the bore directly above the bulb being so restricted that the mercury column therein will be of too small diameter to carry the electric control current but expanding at a higher level to a somewhat increased diameter so that the mercury column will be of sufficient cross-sectional area to carry the control current, and a pair of spaced apart electric contacts mounted in the stem to engage the mercury column in the bore of increased diameter.

PAUL B. PARKS.
TIMOTHY J. LEHANE.